(12) United States Patent
Lopez et al.

(10) Patent No.: US 9,935,747 B2
(45) Date of Patent: Apr. 3, 2018

(54) TRANSMITTING NODE, RECEIVING NODE AND METHODS PERFORMED THEREIN

(71) Applicant: Telefonaktiebolaget L M Ericsson (publ), Stockholm (SE)

(72) Inventors: Miguel Lopez, Solna (SE); Stefan Eriksson Löwenmark, Färentuna (SE); Mårten Sundberg, Årsta (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 189 days.

(21) Appl. No.: 14/408,999

(22) PCT Filed: Nov. 11, 2014

(86) PCT No.: PCT/SE2014/051334
§ 371 (c)(1),
(2) Date: Dec. 18, 2014

(87) PCT Pub. No.: WO2016/076768
PCT Pub. Date: May 19, 2016

(65) Prior Publication Data
US 2016/0134398 A1  May 12, 2016

(51) Int. Cl.
*H04W 4/00* (2009.01)
*H04L 5/00* (2006.01)
*H04B 7/06* (2006.01)
*H04L 1/06* (2006.01)

(52) U.S. Cl.
CPC ......... *H04L 5/0044* (2013.01); *H04B 7/0613* (2013.01); *H04B 7/0669* (2013.01);
(Continued)

(58) Field of Classification Search
CPC .. H04B 7/0671; H04B 7/0697; H04B 7/0613; H04B 7/0667; H04B 7/0669;
(Continued)

(56) References Cited

U.S. PATENT DOCUMENTS 8,144,683 B1 * 3/2012 Sun .................... H04L 25/0202
370/329
2002/0172293 A1  11/2002 Kuchi et al.
(Continued)

FOREIGN PATENT DOCUMENTS

WO       0247278 A2    6/2002

OTHER PUBLICATIONS

Li, Wei et al., "Smart Antennas and Transmit Diversity for GSM Systems", Department of Electrical and Computer Engineering, University of Victoria, BC, Canada, Gulliver, T.A., ISBN 0-7803-7978-0, Aug. 2003, 119-122.
(Continued)

*Primary Examiner* — Harun Chowdhury
(74) *Attorney, Agent, or Firm* — Murphy, Bilak & Homiller, PLLC

(57) ABSTRACT

Embodiments herein relate to a method performed in a transmitting node (12) for transmitting at least one burst of energy to one or more receiving nodes (10,13) in a wireless communication network (1). The transmitting node (12) comprises a number of transmit antennas being more than one and wherein the at least one burst of energy carries a payload for one or more receiving nodes (10,13). The transmitting node (12) determines a shift, for one or more transmit antennas, in one or more signal characteristics of a burst of energy of the at least one burst of energy. The shift indicates one or more additional information bits, in addition to the payload, for a first receiving node (10). The transmitting node further transmits, over the one or more transmit antennas, the burst of energy of the at least one burst of energy with the shift in the signal characteristic carrying the payload to one or more receiving nodes (10,13) in the wireless communication network (1).

4 Claims, 11 Drawing Sheets

(52) U.S. Cl.
CPC .......... *H04L 1/0643* (2013.01); *H04L 5/0092* (2013.01); *H04L 1/0618* (2013.01); *H04L 1/0668* (2013.01)

(58) Field of Classification Search
CPC ............... H04L 5/0048; H04L 25/0226; H04L 27/2613; H04L 69/323; H04L 25/0202; H04L 1/0618; H04L 1/0643; H04L 1/0668; H04L 5/0044; H04L 5/0092
USPC ....... 370/206, 208, 328, 343, 252, 349, 329; 375/267
See application file for complete search history.

(56) References Cited

U.S. PATENT DOCUMENTS

| | | | |
|---|---|---|---|
| 2006/0002361 A1* | 1/2006 | Webster | H04B 7/0697 370/343 |
| 2006/0193245 A1* | 8/2006 | Aghvami | H04B 7/0671 370/208 |
| 2010/0020892 A1 | 1/2010 | Lee et al. | |
| 2013/0272147 A1* | 10/2013 | Vermani | H04B 7/0671 370/252 |
| 2014/0160915 A1* | 6/2014 | Chen | H04L 27/2613 370/206 |
| 2014/0328249 A1* | 11/2014 | Vermani | H04L 69/323 370/328 |
| 2015/0010101 A1* | 1/2015 | Park | H04B 7/0671 375/267 |

OTHER PUBLICATIONS

Mietzner, Jan et al., "Compatible Improvement of the GSM/EDGE System by Means of Space-Time Coding Techniques", IEEE Transactions on Wireless Communications, vol. 2, No. 4, Jul. 2003, 690-702.

Tarokh, Vahid et al., "Space-Time Block Coding for Wireless Communications: Performance Results", IEEE Journal on Selected Areas in Communications, vol. 7, No. 3, Mar. 1999, 451-460.

* cited by examiner

TRANSMITTING NODE, RECEIVING NODE AND METHODS PERFORMED THEREIN

TECHNICAL FIELD

Embodiments herein relate to a transmitting node, a receiving node and methods performed therein. In particular, embodiments herein relate to transmitting a burst of energy in a wireless communication network.

BACKGROUND

In a typical wireless communication network, wireless devices, also known as mobile stations and/or user equipments (UEs), communicate via a Radio Access Network (RAN) to one or more core networks. The RAN covers a geographical area which is divided into cell areas, with each cell area being served by a base station, e.g., a radio base station (RBS), which in some networks may also be called, for example, a "NodeB" or "eNodeB" (eNB). A cell is a geographical area where radio coverage is provided by the radio base station at a base station site or an antenna site in case the antenna and the radio base station are not collocated. Each cell is identified by an identity within the local radio area, which is broadcast in the cell. Another identity identifying the cell uniquely in the whole wireless communication network is also broadcasted in the cell. One base station may have one or more cells. The base stations communicate over the air interface operating on radio frequencies with the wireless devices within range of the base stations.

A Universal Mobile Telecommunications System (UMTS) is a third generation mobile communication system, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for wireless devices. In a forum known as the Third Generation Partnership Project (3GPP), telecommunications suppliers propose and agree upon standards for third generation networks and UTRAN specifically, and investigate enhanced data rate and radio capacity. In some versions of the RAN as e.g. in UMTS, several base stations may be connected, e.g., by landlines or microwave, to a controller node, such as a radio network controller (RNC) or a base station controller (BSC), which supervises and coordinates various activities of the plural base stations connected thereto. The RNCs are typically connected to one or more core networks.

Specifications for the Evolved Packet System (EPS) have been completed within the 3$^{rd}$ Generation Partnership Project (3GPP) and this work continues in the coming 3GPP releases. The EPS comprises the Evolved Universal Terrestrial Radio Access Network (E-UTRAN), also known as the Long Term Evolution (LTE) radio access, and the Evolved Packet Core (EPC), also known as System Architecture Evolution (SAE) core network. E-UTRAN/LTE is a variant of a 3GPP radio access technology wherein the radio base stations are directly connected to the EPC core network rather than to RNCs. In general, in E-UTRAN/LTE the functions of a RNC are distributed between the radio base stations, called eNodeBs in LTE, and the core network. As such, the Radio Access Network (RAN) of an EPS has an essentially "flat" architecture comprising radio base stations without reporting to RNCs.

Currently there is an increased demand of services and devices communicating with one another and there is always a desire to provide a low latency and improved utilization of available bandwidth of a wireless communication network leading to an improved performance of the wireless communication network.

SUMMARY

An object of embodiments herein is to provide a mechanism that improves the performance of a wireless communication network.

According to an aspect the object is achieved by providing a method performed in a transmitting node for transmitting at least one burst of energy to one or more receiving nodes in a wireless communication network. The transmitting node comprises a number of transmit antennas being more than one and wherein the at least one burst of energy carries a payload for one or more receiving nodes. The transmitting node determines a shift, for one or more transmit antennas, in one or more signal characteristics of a burst of energy of the at least one burst of energy, which shift indicates one or more additional information bits, in addition to the payload, for a first receiving node. The transmitting node transmits, over the one or more transmit antennas, the burst of energy of the at least one burst of energy with the shift in the one or more signal characteristics, and carrying the payload to one or more receiving nodes in the wireless communication network.

According to another aspect the object is achieved by providing a method performed in a first receiving node for receiving at least one burst of energy from a transmitting node in a wireless communication network. The at least one burst of energy carries a payload for one or more receiving nodes. The first receiving node receives a burst of energy of the at least one burst of energy from the transmitting node. The first receiving node detects a shift in one or more signal characteristics of the received burst of energy compared to a reference signal characteristic known to the first receiving node. The first receiving node determines one or more additional information bits, in addition to the payload, intended for the first receiving node, of the burst of energy based on the detected shift.

According to yet another aspect a transmitting node for transmitting at least one burst of energy to one or more receiving nodes in a wireless communication network is herein provided. The transmitting node comprises a number of transmit antennas being more than one and wherein the at least one burst of energy is configured to carry a payload for one or more receiving nodes. The transmitting node is configured to determine a shift, for one or more transmit antennas, in one or more signal characteristics of a burst of energy of the at least one burst of energy. The shift indicates one or more additional information bits, in addition to the payload, for a first receiving node. The transmitting node is further configured to transmit over the one or more transmit antennas, the burst of energy of the at least one burst of energy with the shift in the one or more signal characteristics, and carrying the payload to one or more receiving nodes in the wireless communication network.

According to a further aspect a first receiving node for receiving at least one burst of energy from a transmitting node in a wireless communication network is herein provided. The at least one burst of energy is configured to carry a payload for one or more receiving nodes. The first receiving node is configured to receive a burst of energy of the at least one burst of energy from the transmitting node. The first receiving node is further configured to detect a shift in one or more signal characteristics of the received burst of energy compared to a reference signal characteristic known to the first receiving node. The first receiving node is also configured to determine one or more additional information bits, in addition to the payload, intended for the first receiving node, of the burst of energy based on the detected shift.

Embodiments herein enable the utilization of degrees of freedom hitherto unused, by using a shift to indicate one or more additional information bits, opening up the potential to improve latency and bandwidth utilization in legacy wireless communication networks, such as IEEE802.11 or GSM. The bandwidth in legacy wireless communication networks e.g. when a radio channel is stationary or varying very slowly, is thus better utilized and the signaling methodology introduced herein is compatible with legacy devices and is very robust. The performance of the underlying system, e.g. GSM or WiFi 802.11, is not degraded.

BRIEF DESCRIPTION OF THE DRAWINGS

Embodiments will now be described in more detail in relation to the enclosed drawings, in which.

DETAILED DESCRIPTION

Figure 1:
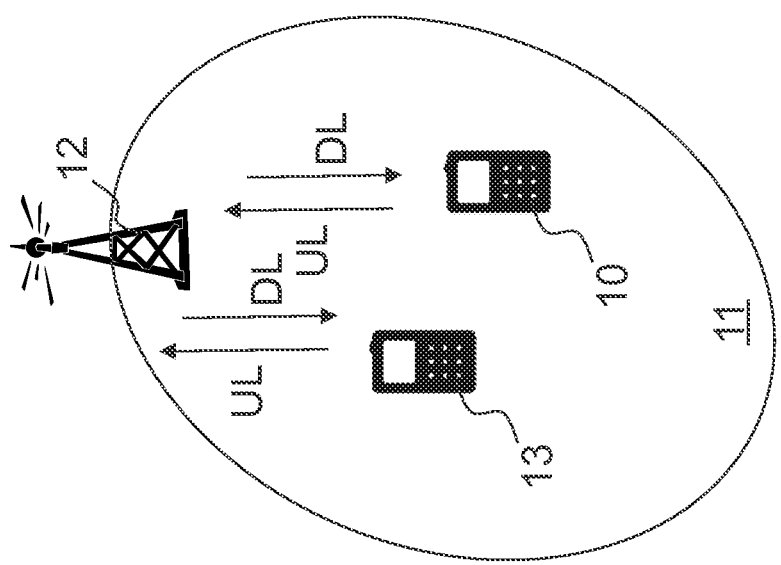
FIG. 1 shows a schematic overview depicting a wireless communication network according to embodiments herein.

Embodiments herein relate to wireless communication networks in general. FIG. 1 is a schematic overview depicting a wireless communication network 1. The wireless communication network 1 comprises one or more RANs and one or more CNs. The wireless communication network 1 may use a number of different technologies, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. The wireless communication network 1 is exemplified herein as an LTE network.

In the wireless communication network 1, a first receiving node 10, also known as a wireless device, mobile station, a user equipment and/or a wireless terminal, communicates via a Radio Access Network (RAN) to one or more core networks (CN). It should be understood by the skilled in the art that "receiving node" is a non-limiting term which means any wireless terminal, user equipment, Machine Type Communication (MTC) device, a Device to Device (D2D) terminal, or a node, e.g. a smart phone, a laptop, a mobile phone, a sensor, a relay, a mobile tablet or even a small base station communicating within respective cell.

The wireless communication network 1 covers a geographical area which is divided into cell areas, e.g. a cell 11 being served by a transmitting node 12. The transmitting node 12 may also be referred to as a radio base station and e.g. a NodeB, an evolved Node B (eNB, eNode B), a base transceiver station, Access Point Base Station, base station router, or any other network unit capable of communicating with a user equipment within the cell served by the radio base station depending e.g. on the radio access technology and terminology used. The transmitting node 12 may serve one or more cells, such as the cell 11. A cell is a geographical area where radio coverage is provided by radio base station equipment at a base station site or at remote locations in Remote Radio Units (RRU). The cell definition may also incorporate frequency bands and radio access technology used for transmissions, which means that two different cells may cover the same geographical area but using different frequency bands. Each cell is identified by an identity within the local radio area, which is broadcast in the cell. Another identity identifying the cell 11 uniquely in the whole wireless communication network 1 is also broadcasted in the cell 11. The transmitting node 12 communicates over the air or radio interface operating on radio frequencies with the receiving node 10 within range of the transmitting node 12. The receiving node 10 transmits data over the radio interface to the transmitting node 12 in Uplink (UL) transmissions and the transmitting node 12 transmits data over an air or radio interface to the first receiving node 10 in Downlink (DL) transmissions. The transmitting node 12 may also communicate with a second receiving node 13 in the cell 11. The second receiving node 13 may be a wireless device, mobile station, a user equipment and/or a wireless terminal, communicates via a Radio Access Network (RAN) to one or more core networks (CN). According to embodiments herein the second receiving node 13 is a legacy terminal. It should be noted that the illustrated embodiments is only an example and it may be the other way around i.e. the transmitting node 12 may be a wireless device and the first receiving node 10 may be a radio base station.

According to embodiments herein the transmitting node 12 comprises a number of transmit antennas being more than one and transmits at least one burst of energy to one or more receiving nodes, e.g. the first and second receiving node. The at least one burst of energy carries a payload for the second receiving node 13 and/or the first receiving node 10. The transmitting node determines a shift, for one or more transmit antennas of the transmit antennas, in one or more signal characteristics of a burst of energy of the at least one burst of energy. The shift indicates one or more additional information bits, in addition to the payload, for the first receiving node 10. The transmitting node 12 then transmits, over the one or more transmit antennas, the burst of energy of the at least one burst of energy with the shift in the signal characteristic/s. The burst of energy further carries the payload to one or more receiving nodes in the wireless communication network 1.

The first receiving node 10 receives the burst of energy from the transmitting node 12 and then detects the shift in one or more signal characteristics of the received burst of energy compared to a reference signal characteristic known to the first receiving node 10. The first receiving node 10 determines, based on the detected shift, the one or more additional information bits intended for the first receiving node 10, of the burst of energy.

Embodiments apply to multi-antenna wireless systems that transmit packets or bursts of energy, such as WiFi (IEEE 802.11) or GSM. The embodiments enable the robust transmission of extra or additional information bits, in addition to the normal payload carried by the packets or bursts of energy. Such extra information bits may be used to convey e.g. signaling and/or control information.

In some embodiments coded or uncoded bits, being examples of additional information bits, are mapped to complex-valued symbols, which in turn are mapped to code matrices by means of a space-time block code. The number of rows in the code matrices is equal to the number of transmit antennas. A column of a code matrix is picked for every burst of energy to be transmitted. Each entry in such column is a complex number with e.g. an amplitude and a phase. The phase and/or amplitude of the signals in each transmitter chain are shifted, according to the phase/amplitudes in the column of the code matrix. The phase/amplitude changes are applied to the whole packet or burst of energy. Hence, one column of a code matrix is transmitted during every burst of energy. Thus, the baud rate is much slower than the baud rate of the underlying system, which typically transmits hundreds or thousands of symbols per burst of energy or packet.

At the receiver side, the first receiving node 10 utilizes the fact that some signal part or parts, e.g. training sequence or symbol, of the transmitted signal are known in advance at the first receiving node 10. For example in 802.11 the burst of energy starts with a known preamble comprising a Short Training Symbol (STF) and a Long Training Symbol (LTF). Likewise, a GSM burst of energy contains a known training sequence, inserted as a midamble. When the channel characteristics, comprising Transmitting (TX) and Receiving (RX) chains, remain approximately constant or being stationary e.g. when the transmitting node 12 and/or the first receiving node 10 being an Internet of Things device being stationary at certain locations, or when the variations can be predicted/compensated, between bursts of energy, the channel, as experienced by the transmitted code matrices, depends on both the actual propagation channel and the known training or pilot symbols. The dependence upon the pilot symbols will be described in detail below. Since the additional information bits are spread over time and space, large diversity and processing gains are obtained, making the transmission scheme very robust. E.g. when the first receiving node 10 may be a sensor in a cellar with a large interfered transmission path, but with a stationary channel i.e. does not vary or changes very slow, the first receiving node 10 may not receive the payload but detects the shift and thus receives the additional information bits.

Some background and notation on space-time codes are herein described that are necessary in order to describe embodiments herein. In-depth explanations of the material in this section are found in Chapter 9 of reference "Space-Time Block Coding for Wireless Communications" Erik G. Larsson and Petre Stoica, Cambridge University Press 2008. Space-time block coding (STBC) is a technique used in wireless communications to transmit multiple copies of a data stream across a number of transmit antennas and to exploit the various received versions of the data, at the first receiving node 10, to improve the reliability of data-transfer. One or more of the received copies are used to correctly decode the received signal. Copies of the received signal may be combined, at the first receiving node 10, to extract as much information from each of them as possible.

For simplicity and concreteness the mathematical descriptions will be limited to the case of two transmit antennas and all examples will utilize a complex-valued Quadrature Phase Shift Keying (QPSK) symbol constellation $$\wp_{QPSK} = \{\exp(j\frac{\pi}{2} \cdot k) \colon k = 0, 1, 2, 3\}. \tag{1}$$

However, the embodiments herein can be applied based on any diversity code e.g. a space-time block code, any symbol constellation, and with any number of transmit and receive antennas.

Space-Time Block Codes (STBC)

The space-time block code may be the Alamouti code. It can be described as follows. Given two QPSK symbols $q(n) \in \wp_{QPSK}$, n=1, 2, the code matrix G is computed according to the formula $$G = \Sigma_{n=1}^{2} \Re e\{q(n)\}A_n + j \cdot \Im m\{q(n)\}B_n, \tag{2}$$

where $$A_1 = \begin{bmatrix} 1 & 0 \\ 0 & -1 \end{bmatrix}, \tag{3}$$

$$A_2 = \begin{bmatrix} 0 & 1 \\ 1 & 0 \end{bmatrix},$$

$$B_1 = \begin{bmatrix} 1 & 0 \\ 0 & 1 \end{bmatrix},$$

$$B_2 = \begin{bmatrix} 1 & -1 \\ 1 & 0 \end{bmatrix}.$$

In other words, the set of 2×2 code matrices $\mathcal{M}$ is of the form $$\mathcal{M} = \{G = \Sigma_{n=1}^{2} \Re e\{q(n)\}A_n + j \cdot \Im m\{q(n)\}B_n | q_n \in \wp_{QPSK}, n=1,2\}. \tag{4}$$

Differential Space-Time Block Codes

Differential space-time block codes are useful in practice because decoding does not require channel estimation. The Alamouti code may be easily adapted to construct a differential space-time block code as follows. First, the modulation symbols $q_n$ are mapped to 2×2 matrices G as described in the previous section. That is, given an integer index p and two QPSK modulation symbols $q_p$, $q_{p+1}$ the matrix G is given by $$G(p) = \Sigma_{n=1}^{2} \Re e\{q(p+n-1)\}A_n + j \cdot \Im m\{q(p+n-1)\}B_n, \tag{5}$$

Secondly, the Alamouti 2×2 matrices G(p) are differentially encoded to construct the code matrices X(p) according to the recursive rule $$X(0) = I, \tag{6}$$

$$X(p+2) = X(p)G(p+2). \tag{7}$$

Notice that only the even indices p=0, 2, 4, . . . are used. The odd indices are not used.

Space-Time Trellis Codes and Delay Diversity

The simplest space-time trellis code is transmit diversity, i.e. transmit with a delay between the transmit antennas. Given input QPSK modulation symbols q(n) and a delay D, the modulation symbols transmitted through the first antenna $q_1(n)$ and through the second antenna $q_2(n)$ are simply $$q_1(n)=q(n), q_2(n)=q(n-D). \quad (8)$$

In OFDM wireless systems cyclic delay diversity is often used. In this case $$q_1(n)=q(n), q_2(n)=q((n-D) \bmod N_{FFT}), \quad (9)$$

wherein $N_{FFT}$ is the Fast Fourier Transform (FFT) size.

Space-Time Codes in Wireless Communication Networks

Many wireless standards support space-time codes, e.g. 802.11n, 802.11ac, while others, such as GSM, can be enhanced to support space-time codes. "Compatible improvement of the GSM/EDGE system by means of space-time coding techniques" Mietzner, J.; Fac. of Eng., Univ. of Kiel, Germany; Hoeher, P. A.; Sandell, M. 2003 Jul. 9 ISSN 1536-1276, and "Smart antennas and transmit diversity for GSM systems" Wei Li; Dept. of Electr. & Comput. Eng., Victoria Univ., BC, Canada; Gulliver, T. A. August 2003 ISBN 0-7803-7978-0 describe applications of Space Time Block Coding (STBC) to GSM.

Packet Format for 802.11ac

Figure 2:
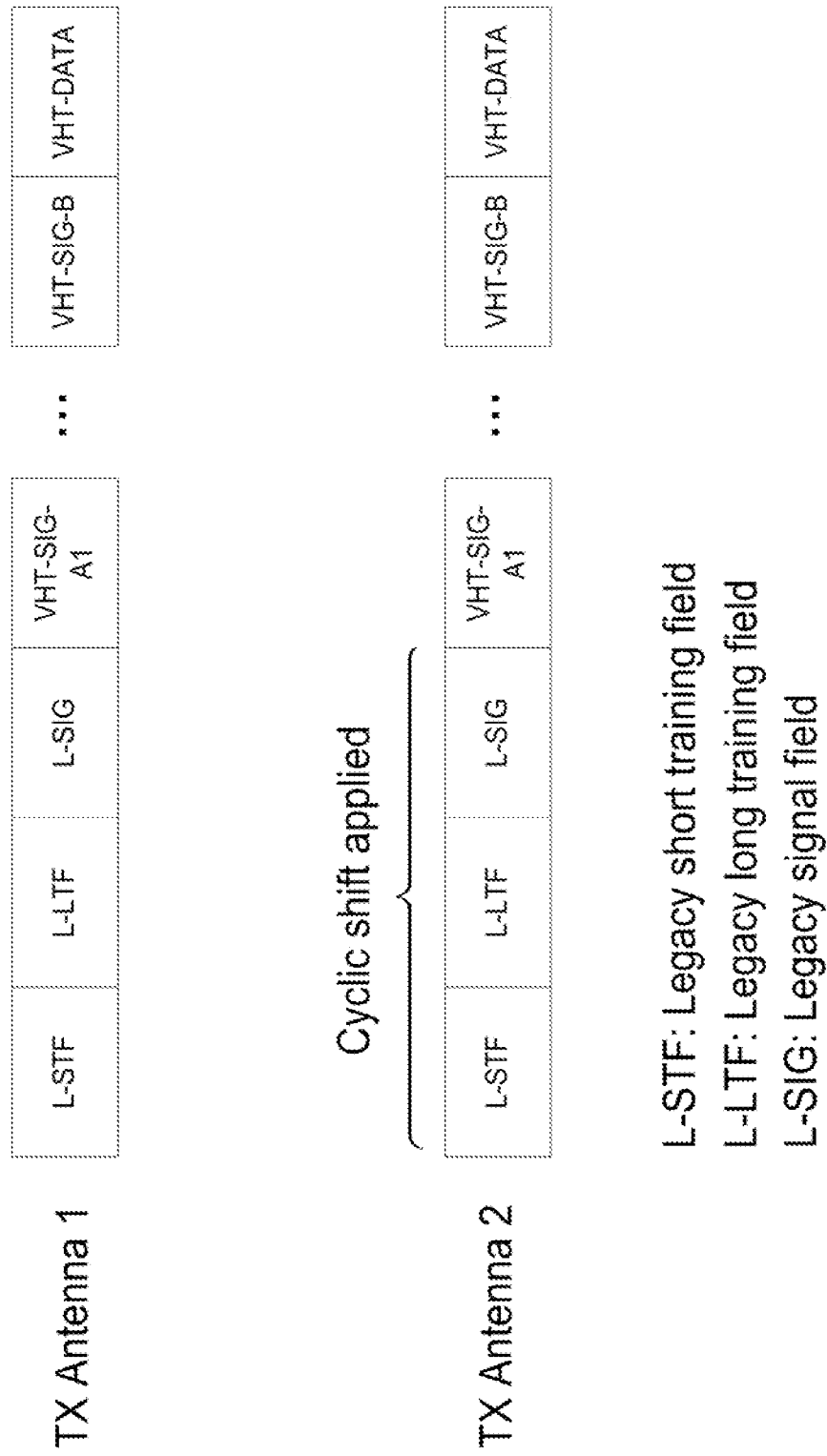
FIG. 2 shows a schematic frame structure of different transmit antennas.

FIG. 2 illustrates the packet format in 802.11 ac packets. The IEEE standard 802.11ac will be used to exemplify the embodiments herein. However, embodiments are applicable to all amendments of 802.11 that support transmit diversity, such as 802.11n or 802.11ah. All 802.11ac packets start with some known training sequences in fields, called the Legacy Short Training Field (L-STF) and the Legacy Long Training Field (L-LTF), followed by a Legacy Signal Field (L-SIG). The packet format further comprises Very High Throughput Signal A1 (VHT-SIG-A1) to Very High Throughput Signal B (VHT-SIG-B) fields and also a Very High Throughput Data (VHT-data) field. The cyclic shift is applied to a signal part such as the training sequence, the L-STF, L-LTF, and L-SIG.

Figure 3:
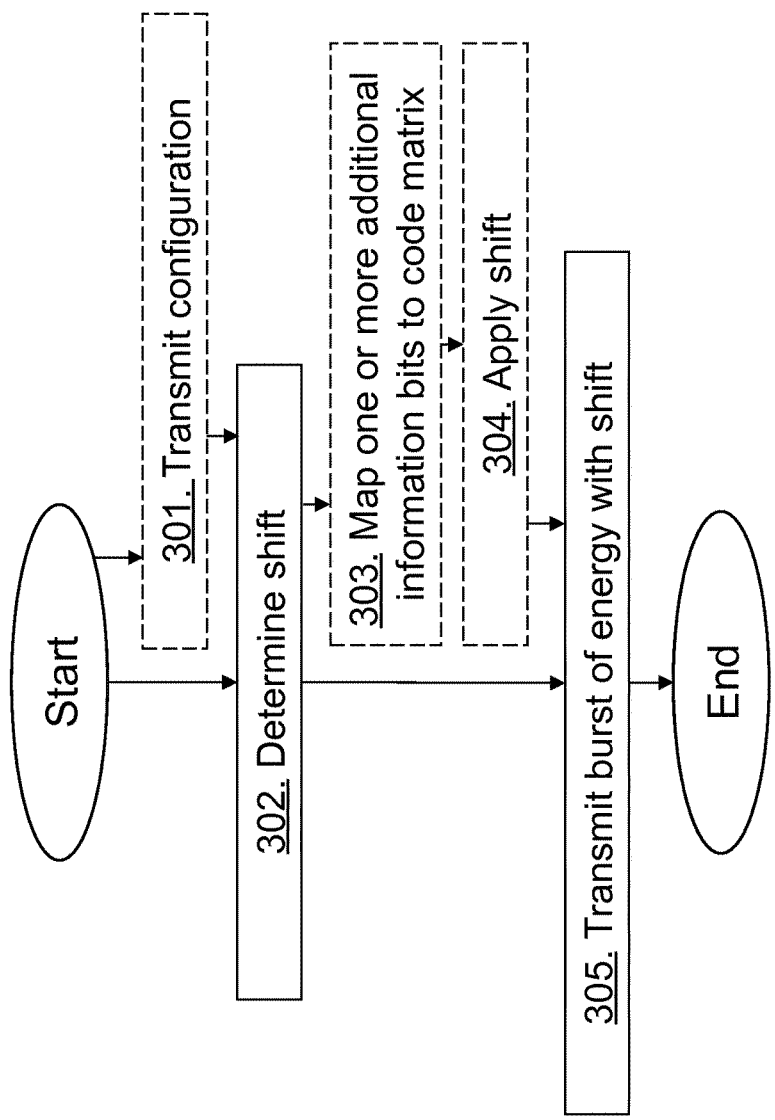
FIG. 3 shows a schematic flowchart depicting a method in a transmitting node according to embodiments herein.

The method actions performed in the transmitting node 12 for transmitting at least one burst of energy to one or more receiving nodes in the wireless communication network 1 according to some embodiments will now be described with reference to a flowchart depicted in FIG. 3. The actions do not have to be taken in the order stated below, but may be taken in any suitable order. Actions performed in some embodiments are marked with dashed boxes. The transmitting node 12 comprises as stated above a number of transmit antennas, e.g. four transmit antennas, being more than one. The at least one burst of energy carries a payload for one or more receiving nodes, e.g. the second receiving node 13. According to embodiments herein a concept of a super-channel for information transfer, i.e. the one or more additional information bits, to a first receiving node 10, on an existing channel utilizing non-information bearing signal characteristics or parameters, i.e. the shift in one or more signal characteristics, may be used herein and partially generalize the concept to multi-antenna systems. Embodiments herein cover e.g. Multiple Input Multiple Output (MIMO) systems, and a narrow class of modulations. Embodiments herein may be applied to transmitting nodes in wireless communication networks with multiple transmit antennas, such as WiFi 802.11 ac or GSM with transmit diversity.

The following actions are performed at the transmitting node 12. The transmitting node 12 and/or the first receiving node 10 may be an Internet of Things device.

Action 301.

The transmitting node 12 may transmit configuration to one or more receiving nodes comprising information regarding a channel carrying the bursts of energy. The information may comprise radio frequency, a set of timeslots used, a training sequence code and/or modulation used, and/or information regarding how the one or more additional information bits are mapped to the shift in the one or more signal characteristics.

Action 302.

The transmitting node 12 determines a shift, for one or more transmit antennas, in one or more signal characteristics of a burst of energy of the at least one burst of energy. The shift indicates one or more additional information bits, in addition to the payload, for the first receiving node 10. The determined shift in one or more signal characteristics of the burst of energy may be realized by changing a timing, frequency, amplitude and/or phase of the burst of energy. The determined shift may be relative to a previous burst of energy.

Action 303.

The transmitting node 12 may map the one or more additional information bits to a code matrix by means of a diversity code. E.g. the one or more additional information bits may be mapped to a complex valued symbol, which complex valued symbol is mapped to the code matrix. The code matrix comprises a number of rows that is equal to the number of transmit antennas of the transmitting node 12 and a number of columns. The diversity code may be a space-time block code, a differential space-time code and/or similar.

Action 304.

The transmitting node 12 may apply respectively for each transmit antenna out of the number of transmit antennas, the determined shift in one or more signal characteristics of the burst of energy, for carrying the one or more additional information bits, according to an entry of a column in the matrix. Each entry in the column is a complex number with one or more signal characteristics.

Action 305.

The transmitting node 12 transmits, over the one or more transmit antennas, the burst of energy of the at least one burst of energy with the shift in the one or more signal characteristics, and carrying the payload to one or more receiving nodes in the wireless communication network 1. Two bursts may have different payloads and a burst may be transmitted over a plurality of transmit antennas or a plurality of bursts may be transmitted over a respective transmit antenna or on different transmit antennas. The burst of energy comprises a signal part, which signal part is known to the first receiving node 10. The payload may be transmitted to the second receiving node 13 and the one or more additional information bits may be transmitted to the first receiving node 10. The one or more additional information bits may be used to convey control signalling, system information, in-band signalling, user plane data, buffer status and/or device capability, of the transmitting node 12. The one or more additional information bits may be transparent to the second receiving node 13.

In some embodiments the transmitting node 12 determines one or more shifts in one or more signal characteristics of a plurality of bursts of energy, which one or more shifts indicates the one or more additional information bits. The transmitting node 12 may then transmit the plurality of bursts of energy in sequence. E.g. in case STBC is used, the additional information bits are mapped to a sequence of X bursts for each transmit antenna.

The determined shift may be added to the burst of energy that is already coded using a diversity code on symbol level.

The payload is, at the transmitting node 12, encoded, modulated and mapped to the transmit antennas according to a wireless standard. SU-MIMO, MU-MIMO, and any number of space or space-time streams may be used. According to embodiments herein an STBC, being a diversity code, may be used to map the additional information bits to code matrices. The code matrices have as many rows as there are transmit antennas. For each burst of energy or packet, a column of a code matrix is chosen. The phase and/or amplitude of the burst transmitted through a first antenna are shifted according to the phase and/or amplitude of the first entry in the chosen column of the code matrix. The procedure is repeated for all transmit antennas. The phase and/or amplitude of the burst of energy transmitted through a second antenna are shifted according to the phase and/or amplitude of the second entry in the chosen column of the code matrix. The same procedure is applied to the bursts of energy transmitted through the other antennas. Thus, one column of a code matrix is transmitted with every burst of energy.

Hence, the transmitting node 12 sends additional information bits, coded or uncoded bit/s, to the same receiving node or to a receiving node different from the receiving nodes in the case of MU-MIMO, for which the payload is intended. See FIG. 4 for an illustration. In the upper figure, four packets are transmitted from a transmitting node denoted 'STA 1', being an example of the transmitting node 12, to a receiving node 'STA 2' being an example of the first receiving node 10. Embodiments herein allow additional four additional bits, '1001' in this example, to be transmitted in parallel with the four packets to the receiving node STA 2.

Figure 4:
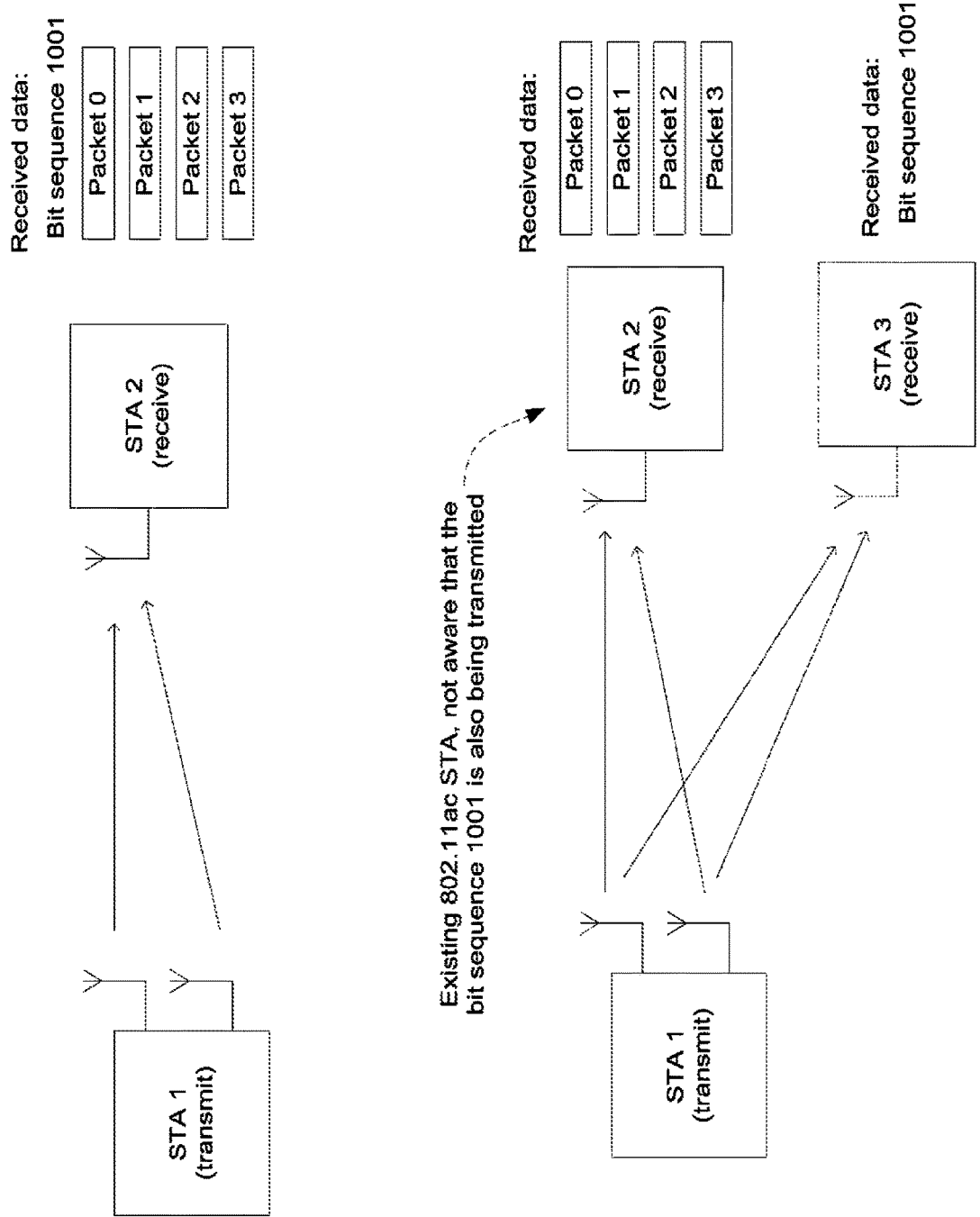
FIG. 4 shows examples of payload and additional information bits according to embodiments disclosed herein.

In the lower part of the FIG. 4, the packets and the additional information bits have different destinations, STA 2 and STA 3 respectively. Hence, the STA 2 is an example of the second receiving node 13 receiving the payload and the STA 3 is an example of the first receiving node 10 receiving the additional information bits. STA 2 is a legacy node not being aware that the bit sequence, the additional information bits, '1001' is also being transmitted.

Figure 5:
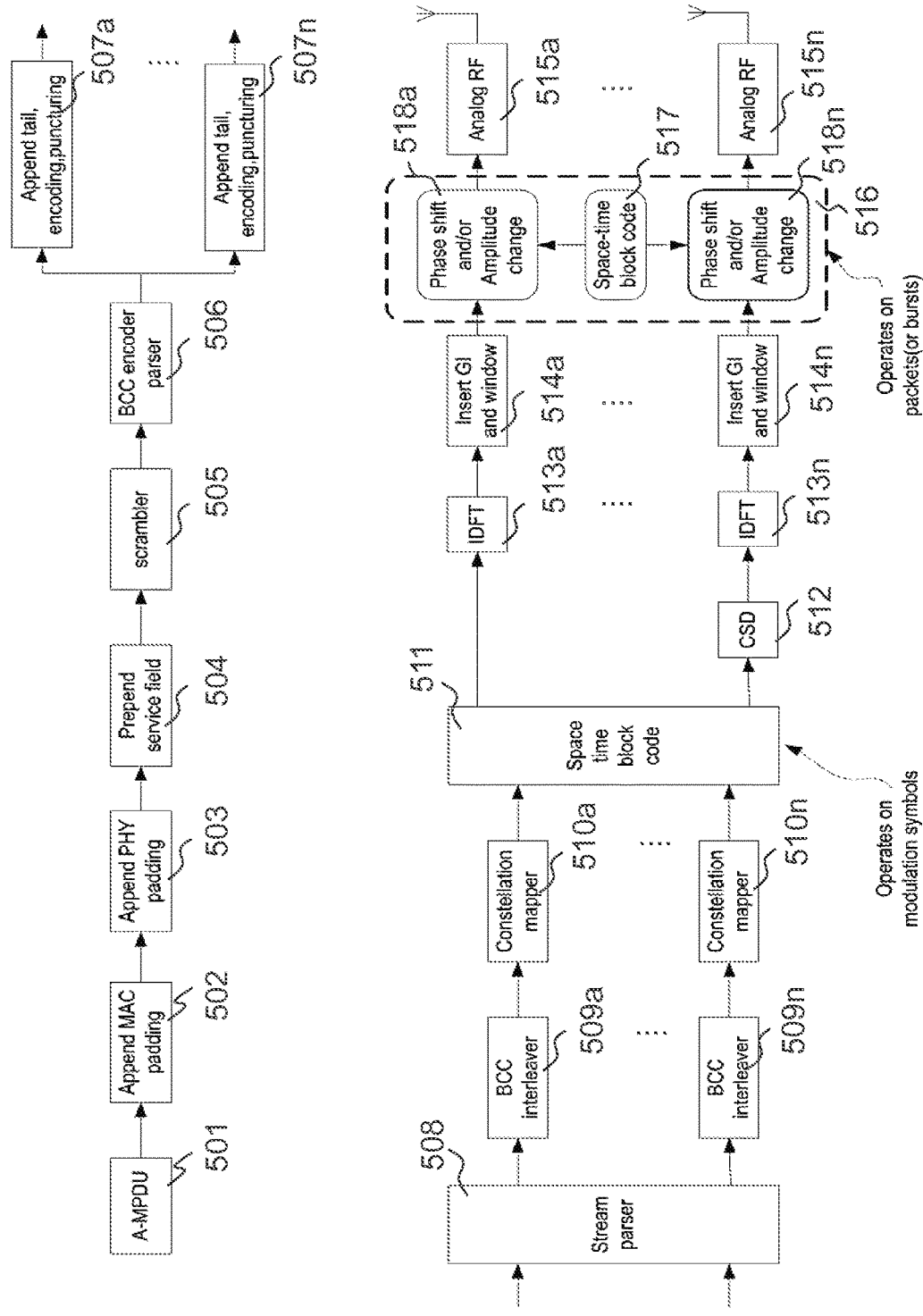
FIG. 5 shows an example of an 802.11 ac transmitter with n TX antennas, modified according to embodiments herein.
Figure 6:
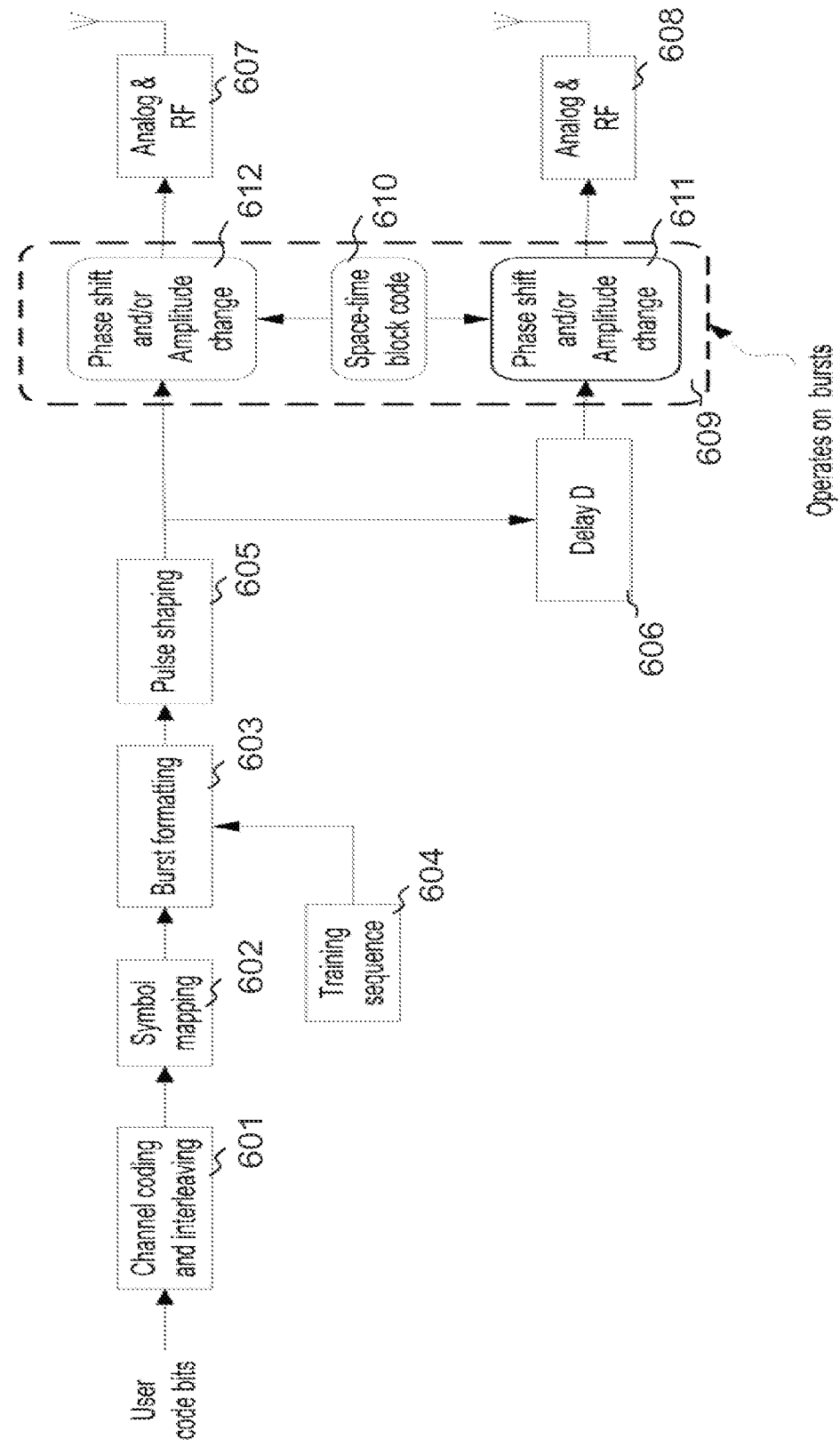
FIG. 6 shows an example of an GSM/EDGE transmitter with two TX antennas modified according to embodiments herein.
Figure 7:
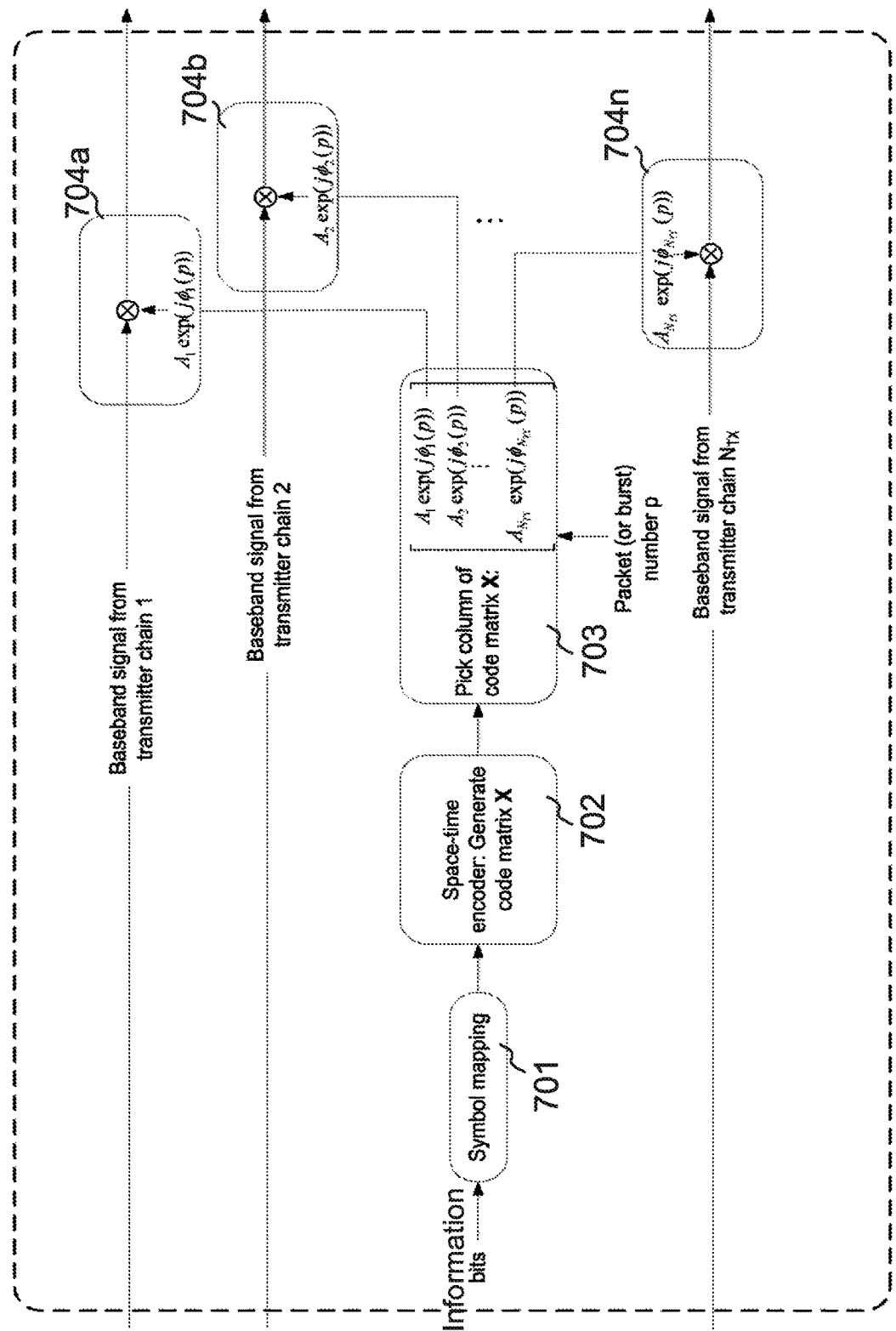
FIG. 7 shows an STBC block according to embodiments herein.

FIG. 5 and FIG. 6 illustrate how to modify 802.11 ac and GSM/EDGE transmitters according to the embodiments herein. FIG. 7 shows in detail actions 303 and 304 above. Block diagram of transmitter processing according to embodiments, for a transmitter chain with N transmit antennas. This FIG. 7 expands the dashed boxes in FIG. 5 and FIG. 6.

According to FIG. 5, an 802.11 ac transmitter with n TX antennas may comprise an Aggregated Mac Protocol Data Unit (A-MPDU) 501, an append Medium Access control (MAC) padding block 502, an append physical (PHY) padding block 503, and a prepend service field block 504. Furthermore, the transmitter may comprise a scrambler 505, a binary convolutional code (BCC) encoder parser 506, a plurality of append tail, encoder and puncture blocks 507a, . . . , and 507n, a stream parser 508, a plurality of BCC interleaver blocks 509a, . . . , and 509n, a plurality of constellation mapper blocks 510a, . . . , and 510n, a space time/frequency block coding (STBC/SFBC) block 511 that operates on modulation symbols, a cyclical shift diversity (CSD) block 512, a plurality of Inverse Discrete Fourier transform (IDFT) blocks 513a, . . . , and 513n, a plurality of insert guard interval (GI) and window blocks 514a, . . . , and 514n, and a plurality of analog radio frequency (RF) blocks 515a, . . . , and 515n.

According to embodiments herein the transmitter may comprise an STBC block 516 that operates on bursts also referred to as packets. The STBC block 516 comprises a STBC 517 but also a plurality of phase shift and/or Amplitude change blocks 518a . . . 518n. The STBC block 516 applies a shift in phase and/or amplitude according to a known scheme thereby transferring additional information bit/s to a receiver that also is aware of the known scheme. The dashed box contains the functionality introduced by embodiments herein.

FIG. 6 shows an example of an GSM/EDGE transmitter with two Transmit (TX) antennas, modified according to the invention. The dashed box contains the functionality introduced by embodiments herein.

User Code bits, i.e. payload, are fed into the signal processing procedure in the GSM/EDGE transmitter. The transmitter may comprise a channel coding and interleaving block 601, a symbol mapping block 602, and a burst formatting block 603 fed with a training sequence 604. The transmitter may further comprise a pulse shaping block 605, a delay block 606 for the second TX antenna, and two Analog and RF blocks 607, 608. The transmitter according to embodiments herein may comprise a STBC block 609 that operates on bursts of energy. The STBC block 609 comprises a STBC 610 but also two phase shift and/or Amplitude change blocks 611, 612. The STBC block 609 applies a shift in phase and/or amplitude according to a known scheme thereby transferring the additional information bit/s to a receiver that also is aware of the known scheme.

FIG. 7 is an example of the STBC block 516 and STBC block 609 for n transmit antennas. One or more information bits are fed into a symbol mapping block 701, mapping the one or more additional information bits to a complex valued symbol. The complex valued symbol is mapped to a code matrix X by means of a diversity code e.g. an STBC. The code matrix X is generated in a space time encoder 702 and comprises a number of rows that is equal to the number of transmit antennas and a number of columns. A column of the code matrix X is picked for every burst of energy p to be transmitted in a pick block 703. Each entry in such column is a complex number with e.g. an amplitude and a phase. The phase and/or amplitude of the baseband signals in each transmitter chain are shifted in shift blocks 704a, 704b, . . . 704n, according to the phase/amplitudes in the column of the code matrix. The phase/amplitude changes are applied to the whole packet or burst. Hence, one column of a code matrix is transmitted during every burst of energy.

Receiver or First Receiving Node 10

At the receiver side, i.e. at the first receiving node 10, detection is based on the known signal part such as training or pilot symbols contained in the transmitted signals.

For the sake of concreteness, the receiver algorithms will be described for the simple but relevant case of two transmit antennas and one receive antenna. The STBC receiver algorithms described in reference Space-Time Block Coding for Wireless Communications, Erik G. Larsson and Petre Stoica, Cambridge University Press 2008 do not apply to the embodiments herein. But the STBC receiver algorithms described may be extended to cover the space-time codes introduced in embodiments herein, as shown below.

Notation and Conventions

Boldface capital letters will denote matrices, while boldface small letters will denote column vectors. The trace of a matrix is denoted by $\text{tr}\{.\}$. The norm $\|A\|$ of a matrix A is the Frobenius norm defined by $\|A\|^2 = \text{tr}\{A^H A\}$. $\Re e\{.\}$, $\Im m\{.\}$ denote real and imaginary parts respectively. Also, the notation for space-time block codes introduced above will be used.

The time domain known pilots transmitted through transmit antennas 1 and 2 are denoted by $(s_1(n))_{n=0}^{N-1}$ and $(s_2(n))_{n=0}^{N-1}$ respectively. It is assumed that there are 2 training sequences, each containing N training symbols. Each training symbol is a complex valued number from a symbol constellation. The two training sequences will in general be different, but the embodiments work even when the training sequences are equal. For example, when the multi-antenna wireless system to which the embodiment is applied uses delay diversity, then $$s_1(n)=s(n), s_2(n)=s(n-D). \tag{10}$$

The discrete equivalent channel from antenna k to the receive antenna is denoted $h_k$ and it is assumed that it is represented by a Finite Impulse Response (FIR) filter with L+1 taps. A non-standard convention is adopted to write the channel taps in the form $[c_k h_k(0), c_k h_k(1), \ldots, c_k h_k(L)]^T$, with $h_k(0)=1$, and $c_k$ a non-zero complex constant. This is done in order to highlight the importance of the phase of the received signal in the signaling scheme proposed in the embodiments herein.

Coherent Detection

The time domain received samples corresponding to the known training sequences and packet/burst number p are written in the form $$r(p,n)=c_1 x_1(p)\Sigma_{i=0}^L h_1(i)s_1(n-i)+c_2 x_2(p)\Sigma_{i=0}^L h_2(i)s_2(n-i)+w(p,n), n=L, \ldots, N-1. \tag{11}$$

Here w(p,n) are noise samples, independent and identically Gaussian distributed, and $x_k(p)$ are the phase/amplitude shifts imparted at the k-th transmit antenna, for k=1, 2. I.e. $x_k(p)$, k=1, 2 are the two elements in a column of a code matrix.

If receiver not aware that transmitter methodology of embodiments herein has been employed, it would experience the phase/amplitude shifts $x_k(p)$ as part of the channel variation. That is, the channel taps that could be estimated at the receiver would be of the form $c_k x_k(p) h_k(i)$. For coherent detection it is assumed that the receiver can estimate $c_k h_k(i)$. This can be accomplished, for example, by applying a shift $x_k(p)=1$ during some training packets/bursts which are known to the receiver.

In order to simplify Equation (11), define $$u_m(n)=c_m\Sigma_{i=0}^L h_m(k)s_m(n-i), m=1,2; n=L, \ldots, N. \tag{12}$$

Note that by assumption $u_m(n)$ is known, or can be estimated, at the receiver. Using this notation, Equation (11) can be re-written as $$r(p,n)=x_1(p)u_1(n)+x_2(p)u_2(n)+w(p,n), n=L, \ldots, N-1. \tag{13}$$

From this last expression it can be seen that the channel, as experienced by the code matrices, consists of the taps $u_m(n)$, which in turn depend on both the propagation channel and the known pilot symbols. Notice also that even though the channel is time dispersive, the slow signaling rate makes the channel as experienced by the code matrices, free of inter-symbol interference.

It will be convenient to collect the received samples from packets/bursts p and p+1 in a matrix. To this end, define $$R(p) = \begin{bmatrix} r(p, L) & r(p+1, L) \\ \vdots & \vdots \\ r(p, N) & r(p+1, N) \end{bmatrix}$$

Received samples over known training/pilot symbols.

$$U = \begin{bmatrix} u_1(L) & u_2(L) \\ \vdots & \vdots \\ u_1(N) & u_2(N) \end{bmatrix}$$

by hypothesis independent of the packet number.

$$X(p) = \begin{bmatrix} x_1(p) & x_1(p+1) \\ x_2(p) & x_2(p+1) \end{bmatrix}$$

Transmitted code matrix.

$$W(p) = \begin{bmatrix} w(p, L) & w(p+1, L) \\ \vdots & \vdots \\ w(p, N) & w(p+1, N) \end{bmatrix}$$

White noise matrix.

With this notation, Equation (13) becomes simply $$R(p)=U X(p)+W(p). \tag{18}$$

The maximum likelihood estimator of the transmitted code matrix is, using the notation above, $$\hat{X}=\arg\min\{\|R(p)-UG\|^2 : G \in \mathcal{M}\}. \tag{19}$$

The minimization in (19) is equivalent to the maximization $$\max\{\Re e\{tr\{GR(p)^H U\}\} : G \in \mathcal{M}\}. \tag{20}$$

When the Alamouti code and QPSK modulation symbols have been employed, the maximization problem becomes $$\max\{\Re e\{tr\{(\Sigma_{n=1}^2 \Re e(q_n)A_n + j \cdot \Im m(q_n)B_n)R(p)^H U\}\} | q_n \in \wp_{QPSK}, n=1,2\}, \tag{21}$$

which in turn can be expanded into $$\max\{tr\{\Sigma_{n=1}^2 \Re e\{A_n R(p)^H U\} \Re e(q_n) - \Sigma_{n=1}^2 \Im m\{B_n R(p)^H U\} \Im m(q_n)\} | q_n \in \wp_{QPSK}, n=1,2\}. \tag{22}$$

This maximization problem may be decoupled into two maximization problems, yielding the following maximum likelihood estimator for the modulation QPSK symbols:

$$\hat{q}_n=\max\{tr\{\Re e\{A_n R(p)^H U\} \Re e(q_n) - \Im m\{B_n R(p)^H U\} \Im m(q_n)\} | q_n \in \wp_{QPSK}\}, n=1,2. \tag{23}$$

p is the burst number, $q_n$ are the QPSK symbol hypotheses corresponding to the shifts imparted to the bursts at the transmitter, $\hat{q}_n$ is the maximum likelihood estimate of the QPSK symbol corresponding to the actual shift imparted to the bursts at the transmitter $A_n$, $B_n$ are fixed matrices that define the STBC, R(p) is a matrix containing the received samples corresponding to the training sequences, U is a matrix whose entries are the convolutions of the training sequences with the channel filters.

Non-Coherent Detection

Coherent detection is not necessary when differential space-time codes are used. In particular, it is not necessary to estimate the channel.

The model used is the same as in Equations (11)-(18) above. However, this time it is not necessary to know the channel nor are the training sequences used explicitly. It is only necessary to know which part of the received signal corresponds to the training sequences.

The starting point is the model of Equation (18):

$$R(p)=UX(p)+W(p),$$

where p is the packet/burst number. Non-coherent maximum likelihood detection requires the minimization of the following quantity $$\|R(p+2)-UX(p+2)\|^2+\|R(p)-UX(p)\|^2. \quad (24)$$

From the definition of the differential space time code, this last expression is equal to $$\|R(p+2)-UX(p)G(p+2)\|^2+\|R(p)-UX(p)\|^2. \quad (25)$$

Using the fact that the matrices G are orthogonal, i.e. $G(p+2)G(p+2)^H=I$, (25) can be re-written as $$\|R(p+2)G(p+2)^H-UX(p)\|^2+\|R(p)-UX(p)\|^2. \quad (26)$$

From the triangle inequality it follows that $$\|R(p+2)G(p+2)^H-UX(p)\|^2+\|R(p)-UX(p)\|^2 \geq \|R(p)-R(p+2)G(p+2)^H\|^2. \quad (27)$$

Equality is obtained when $$UX(p)=\tfrac{1}{2}(R(p+2)G(p+2)^H+R(p)). \quad (28)$$

Noting that $$\|R(p)-R(p+2)G(p+2)^H\|^2=\|R(p+2)G^H-R(p)\|^2, \quad (29)$$

it is seen that the maximum likelihood estimate of the transmitted space-time code matrix is obtained from the following minimization problem.

$$\min\{\|R(p+2)G^H-R(p)\|^2:G\in\mathcal{M}\} \quad (30)$$

From (30) it is seen that the estimation of the code matrix depends only upon the received signal over the training sequences and knowledge of the channel is not required. In fact, not even knowledge of the training sequences is required. It is only necessary to know a location in time of the training sequences.

The minimization (30) is equivalent to the maximization $$\max\{\Re e\{tr\{GR(p+2)^H R(p)\}\}:G\in\mathcal{M}\}. \quad (31)$$

When the Alamouti space-time code, together with QPSK modulation has been used, (31) is equivalent to $$\max\{tr\{\Sigma_{n=1}^2 \Re e\{A_n R(p+2)^H R(p)\}\Re e(q_n)-\Sigma_{n=1}^2 \Im m\{B_n R(p+2)^H R(p)\}\Im m(q_n)\}|q_n\in\wp_{QPSK}, n=1,2\}. \quad (32)$$

As before, the estimation of the QPSK symbols can be decoupled, yielding $$\hat{q}_n=\max\{tr\{\Re e\{A_n R(p+2)^H R(p)\}\Re e(q_n)-\Im m\{B_n R(p+2)^H R(p)\}\Im m(q_n)\}|q_n\in\wp_{QPSK}\}, n=1,2. \quad (33)$$

p is the burst number, $q_n$ are the QPSK symbol hypotheses corresponding to the shifts imparted to the bursts at the transmitter, $\hat{q}_n$ is the maximum likelihood estimate of the QPSK symbol corresponding to the actual shift imparted to the bursts at the transmitter $A_n, B_n$ are fixed matrices that define the STBC, R(p) is a matrix containing the received samples corresponding to the training sequences.

Figure 8:
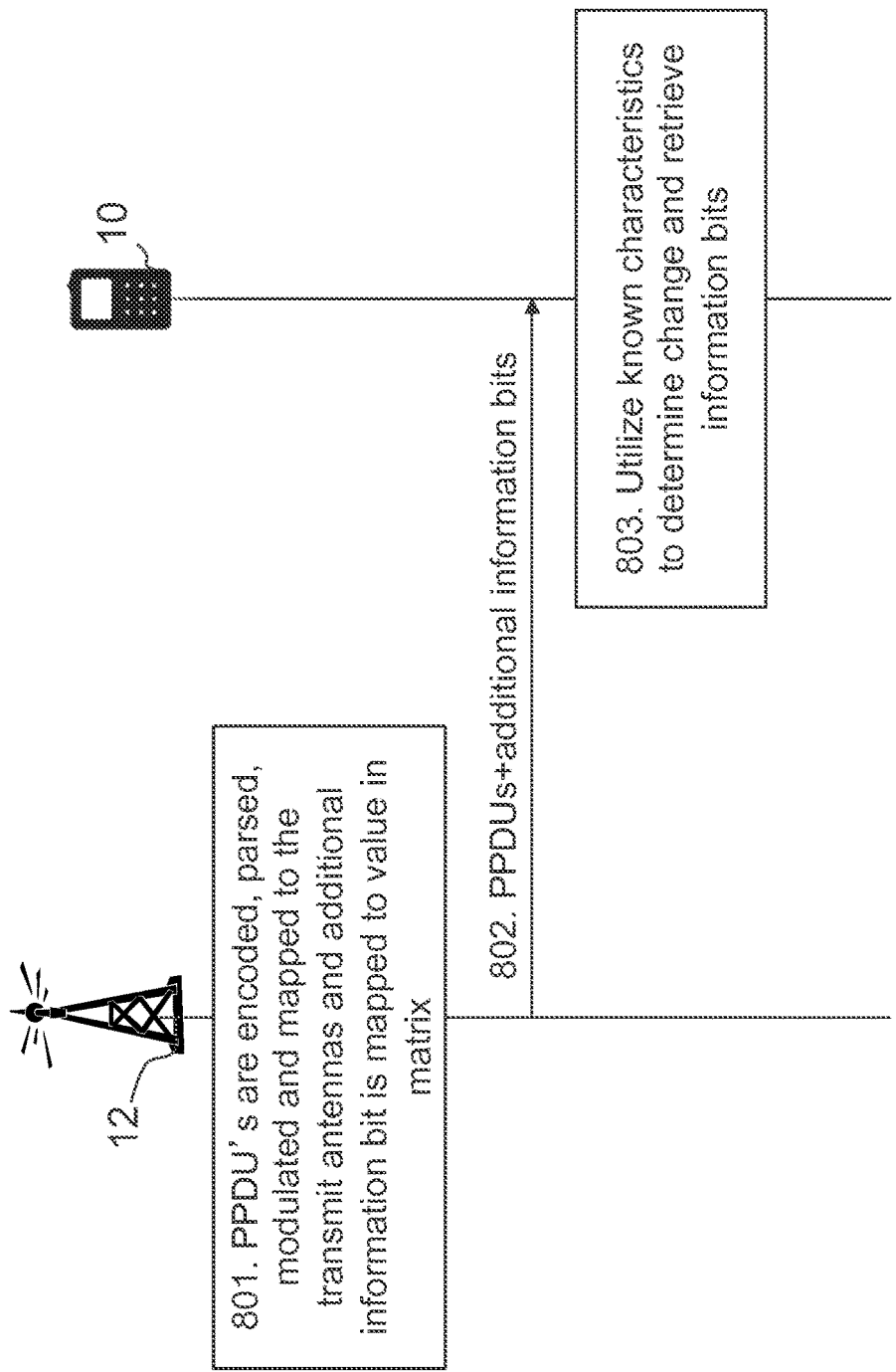
FIG. 8 shows a combined flowchart and signalling scheme according to embodiments herein.

Example of Transmission and Reception Methodology Shown in FIG. 8, which is a Combined Flowchart and Signaling Scheme According to Embodiments Herein.

Embodiments will be exemplified with the aid of an IEEE 802.11ac wireless system which employs two transmit antennas and one receive antenna. In this example the transmitting node 12 sends 4 PPDU's to the first receiving node 10. The illustrated embodiment herein is used to transmit 4 additional information bits to the first receiving node, or alternatively, to send 4 PPDU's to the second receiving node 13. These additional information bits may be used for control signaling, management or other purposes.

Action 801.

At the transmitter side, the transmitting node 12, the 4 PPDU's are encoded, parsed, modulated and mapped to the transmit antennas according to the 802.11 ac standard. In this example it is assumed that the Alamouti space-time code and cyclic shift diversity as described in the 802.11 ac are applied. In total 8 baseband signals are generated, 4 packets×2 transmit antennas. The baseband signals are defined as $\{y_1(t,p): 0\leq t\leq T_p, 0\leq p\leq 3\}$ and $\{y_2(t,p): 0\leq t\leq T, 0\leq p\leq 3\}$. The subscripts 1 and 2 refer to the transmit antenna, p is the PPDU or packet/burst number, and $T_p$ is the duration of the p-th PPDU. The variable time t may be discrete or continuous, since embodiments herein may be applied in the digital domain to a digital baseband signal, or in the analog domain to an analog baseband signal.

Action 802.

In addition to the 4 PPDU's, the additional information bits '1001', see action 305, may be transmitted using a differential Alamouti code and a QPSK constellation, as described in Section above. The encoding process, example of the actions 303 and 304 above, is the following.

Map the bits to QPSK symbols: $10 \rightarrow \exp(j\pi)$, $01 \rightarrow \exp(j\pi/2)$ Generate the code matrices:

$$X(0) = \begin{bmatrix} 1 & 0 \\ 0 & 1 \end{bmatrix}, G(2) = \begin{bmatrix} \exp(j\pi) & \exp(-j\pi/2) \\ \exp(j\pi/2) & -\exp(-j\pi) \end{bmatrix},$$

$$X(2) = X(0)G(2) = \begin{bmatrix} \exp(j\pi) & \exp(j3\pi/2) \\ \exp(j\pi/2) & \exp(j\pi) \end{bmatrix}.$$

Extract the 4 columns from the code matrices. There are exactly as many columns as there are PPDU's. The 4 columns are:

$$\begin{bmatrix} 1 \\ 0 \end{bmatrix},$$

$$\begin{bmatrix} 0 \\ 1 \end{bmatrix},$$

$$\begin{bmatrix} \exp(j\pi) \\ \exp(j\pi/2) \end{bmatrix},$$

$$\begin{bmatrix} \exp(j3\pi/2) \\ \exp(j\pi) \end{bmatrix}.$$

Let's call $\varphi_k(p)$, k=1, 2; p=0, 1, 2, 3 the phase shift associated with column p and antenna k. Thus, $$\begin{bmatrix} \phi_1(0) & \phi_1(1) & \phi_1(2) & \phi_1(3) \\ \phi_2(0) & \phi_2(1) & \phi_2(2) & \phi_2(3) \end{bmatrix} = \begin{bmatrix} 1 & 0 & \pi & 3\pi/2 \\ 0 & 1 & \pi/2 & \pi \end{bmatrix}.$$

Phase shift the baseband signal corresponding to the p-th packet and k-th antenna, k=1, 2; p=0, 1, 2, 3, by $\varphi_k(p)$ radians. That is, $y_k(t,p): 0\leq t\leq T_p$ is mapped to $z_k(t,p)=$ $\exp(j\varphi_k(p)) \cdot y_k(t,p)$, $0 \leq t \leq T_p$. Observe that the phase shift of $\varphi_k$ (p) radians is applied to the whole PPDU, or packet, or burst.

The phase shifted versions $z_k(t,p)$ of the baseband signals $y_k(t,p)$ are transmitted through the two transmit antennas k=1, 2.

Action 803.

At the receiver side, at the first receiving node 10, packet detection and synchronization are performed as usual in 802.11 ac receivers. The 4 packets transmitted start with a known, fixed preamble composed L-STF, L-LTF fields. Note that cyclic shift is applied to the signal transmitted through the second antenna. Assuming that the received signal has been sampled at the symbol rate, the method of Section is applied, with the following values: L=16 samples (cyclic prefix of L-STF), N=64+64+16+64+64=288 (L-STF and L-LTF). The matrices of received samples during the 4 packets R(p), p=0, 2 defined in Equation (18) have dimension 288×2. The maximum likelihood estimate of the transmitted symbols can be found applying (33) with p=0. (Equivalently, the transmitted code matrices are found applying (30) with p=0.)

Figure 9:
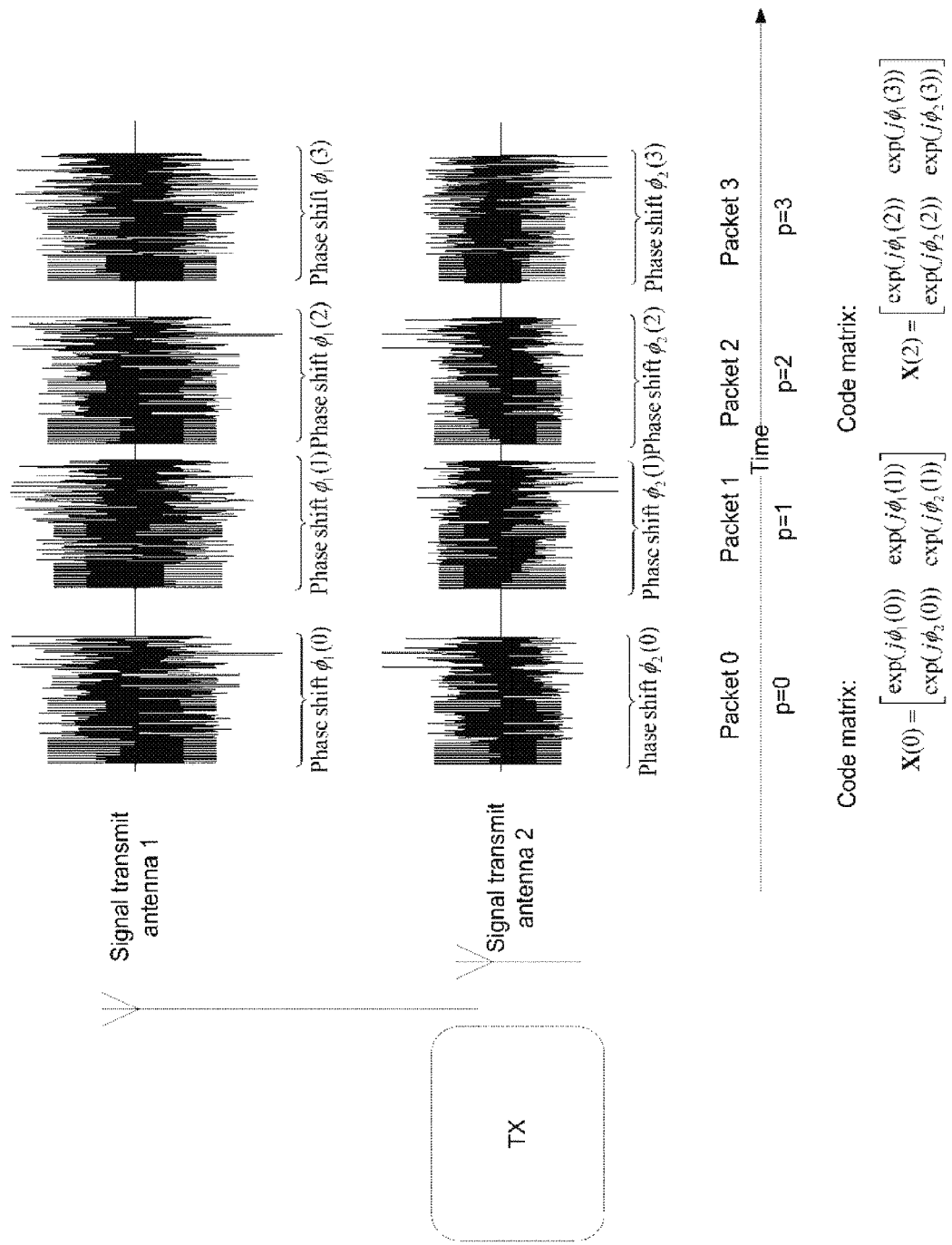
FIG. 9 shows transmissions of bursts/packets according to embodiments herein.

Action 802 is illustrated in FIG. 9. Note that since the code matrices are spread over 288 samples, there is a processing gain of 10*log 10(288)=24.6 dB. In addition, the space-time code gives a spatial diversity gain. Hence, the 4 additional information bits are very robustly transmitted. Code Matrices X(0) and X(2) are used, not matrix X(1), to shift the baseband signals. The 4 additional information bits may be mapped to a sequence of X packets or bursts of energy for each transmit antenna.

Figure 10:
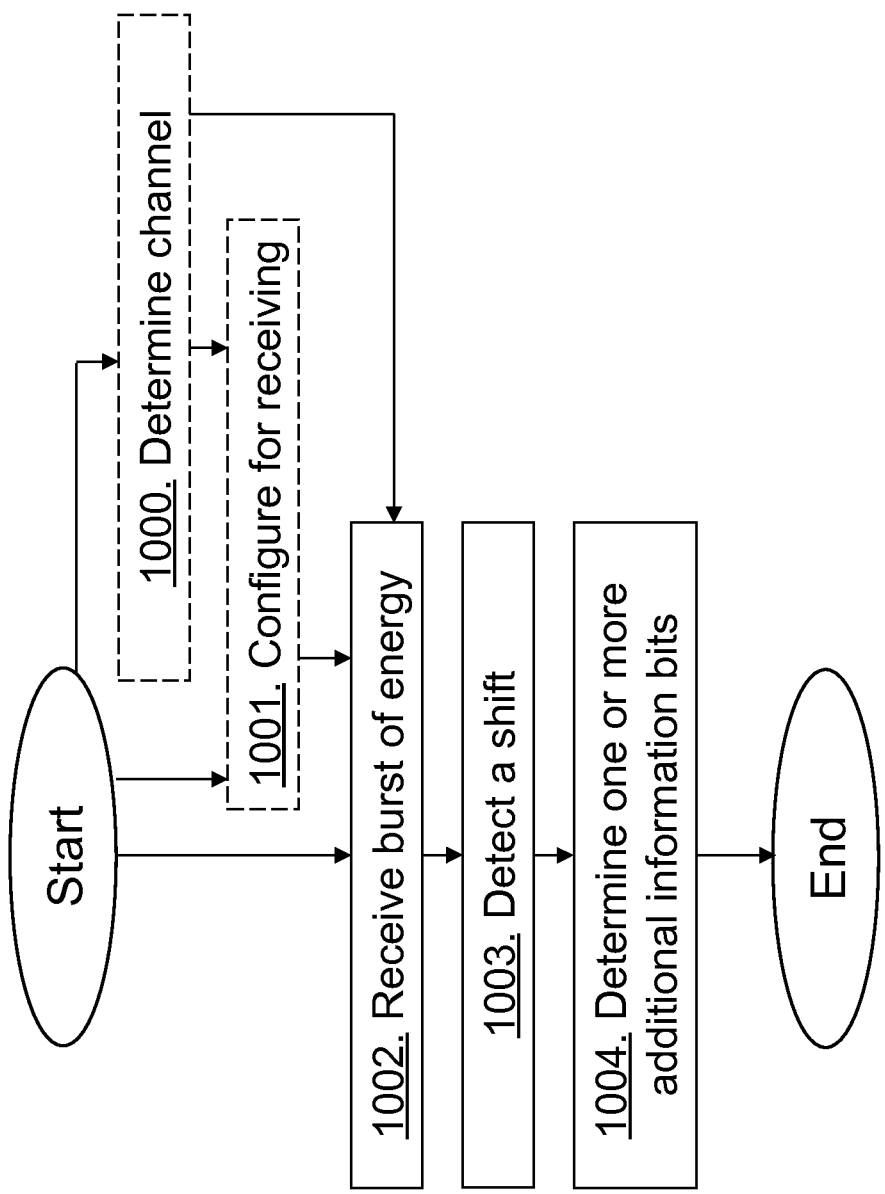
FIG. 10 shows a method in the first receiving node according to embodiments herein.

The method actions in the first receiving node 10 for receiving at least one burst of energy from the transmitting node 12 in the wireless communication network 1 according to some embodiments will now be described with reference to a flowchart depicted in FIG. 10. The actions do not have to be taken in the order stated below, but may be taken in any suitable order. Actions performed in some embodiments are marked with dashed boxes. The at least one burst of energy carries a payload for one or more receiving nodes. The transmitting and/or the first receiving node may be an Internet of Things device.

Action 1000.

The first receiving node 10 may determine a radio channel, carrying the burst of energy, as a radio channel with stationary channel characteristics or a radio channel with channel characteristics varying in a manner known or predicted at the first receiving node 10.

Action 1001.

The first receiving node 10 may configure the first receiving node 10 for receiving the one or more additional information bits by receiving configuration from the transmitting node 12. The configuration may comprise information regarding a channel carrying the bursts of energy, which information comprises radio frequency, a set of timeslots used, a training sequence code and/or modulation used, and/or information regarding how the additional information bits are mapped to the shift in the one or more signal characteristics.

Action 1002.

The first receiving node 10 receives a burst of energy of the at least one burst of energy from the transmitting node 12.

Action 1003.

The first receiving node 10 detects a shift in one or more signal characteristics of the received burst of energy compared to a reference signal characteristic known to the first receiving node. The reference signal characteristic may be a signal part of the burst of energy and the first receiving node 10 may detect the shift on at least a part of the signal part of the burst of energy. The burst of energy comprises payload and a non-information bearing part being the signal part. The detection of the "additional information bits" may be done solely based on the non-information bearing part of the signal, hence the first receiving node 10 monitors the part of the received signal corresponding to the signal part in order to detect the additional information bits.

The detected shift in one or more signal characteristics of the burst of energy may be realized by detecting a change in timing, frequency, amplitude and/or phase of the burst of energy. The detected shift may be relative to a previous burst of energy.

Action 1004.

The first receiving node 10 determines one or more additional information bits, in addition to the payload, intended for the first receiving node 10, of the burst of energy based on the detected shift. The received burst of energy of the at least one burst of energy may be decoded as a diversity code e.g. when the first receiving node receives a number of bursts of energy. The diversity code may be a space-time block code, a differential space-time code and/or similar. The one or more additional information bits may be to convey control signalling, system information, in-band signalling, user plane data, buffer status and/or device capability, of the transmitting node 12.

Figure 11:
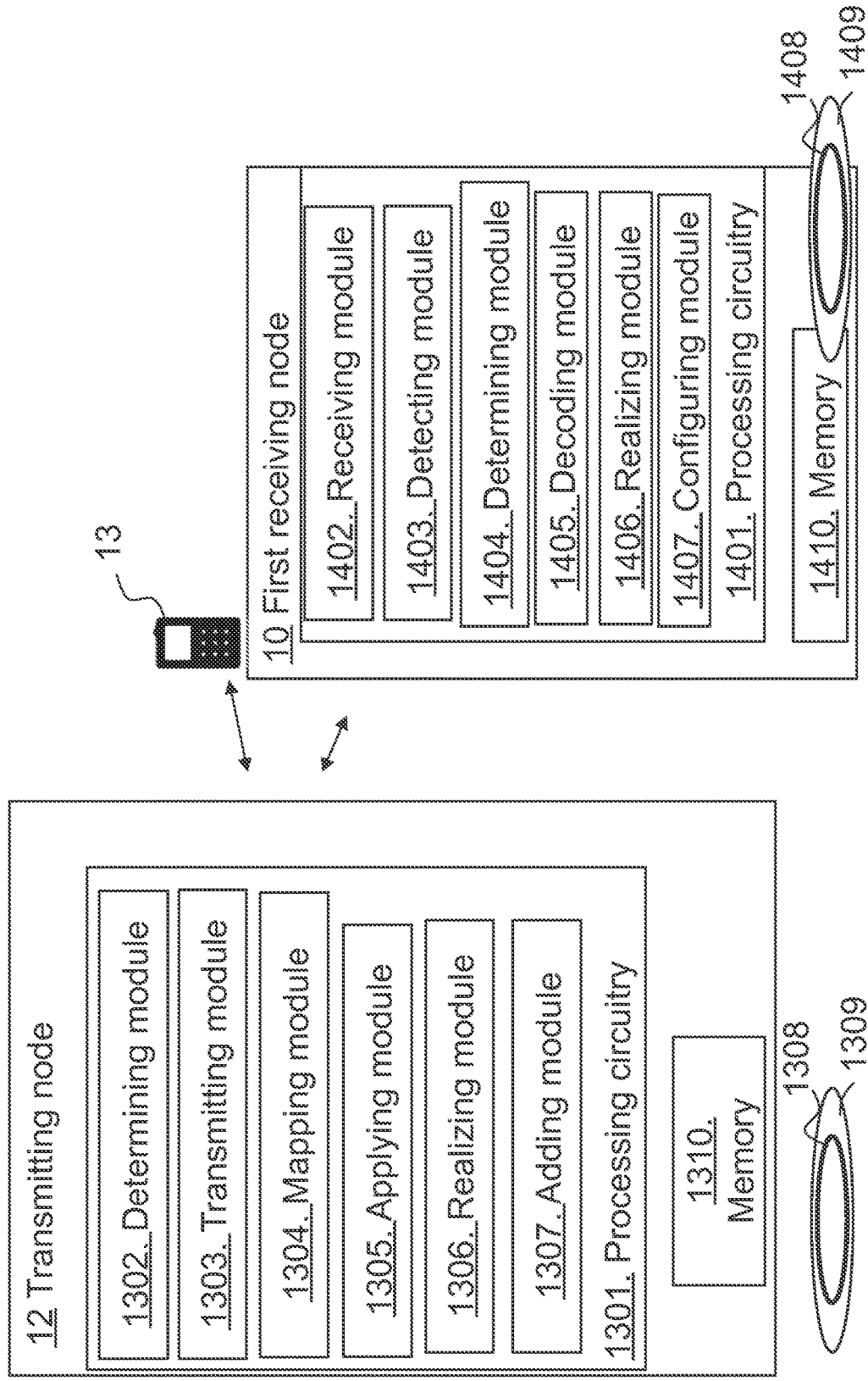
FIG. 11 shows a block diagram depicting a first receiving node and a transmitting node according to embodiments herein.

FIG. 11 is a block diagram depicting the transmitting node 12 and the first receiving node 10 configured to perform the methods herein. The transmitting node 12 for transmitting at least one burst of energy to one or more receiving nodes, e.g. the first and second receiving nodes, in the wireless communication network 1 is provided herein. The transmitting node 12 comprises a number of transmit antennas being more than one and the at least one burst of energy is configured to carry a payload for one or more receiving nodes.

The transmitting node 12 may comprise processing circuitry 1301 and/or a determining module 1302. The transmitting node 12, the processing circuitry 1301 and/or the determining module 1302 may be configured to determine a shift, for one or more transmit antennas, in one or more signal characteristics of a burst of energy of the at least one burst of energy. The shift indicates one or more additional information bits, in addition to the payload, for the first receiving node 10. The transmitting node 12, the processing circuitry 1301 and/or the determining module 1302 may further be configured to determine one or more shifts in one or more signal characteristics of a plurality of bursts of energy, which one or more shifts indicates the one or more additional information bits and also being configured to transmit the plurality of bursts of energy in sequence. The determined shift may be relative to a previous burst of energy.

The transmitting node 12 may comprise a transmitting module 1303. The transmitting node 12, the processing circuitry 1301 and/or the transmitting module 1303 may be configured to transmit over the one or more transmit antennas, the burst of energy of the at least one burst of energy with the shift in the one or more signal characteristics, and carrying the payload to one or more receiving nodes in the wireless communication network 1. The burst of energy may comprise a signal part, e.g. a training sequence, which signal part is known to the first receiving node 10. The transmitting node 12, the processing circuitry 1301 and/or the transmitting module 1303 may be configured to transmit the payload to the second receiving node 13 and to transmit the one or more additional information bits to the first receiving node 10. The payload may also be transmitted to the first receiving node 10. The one or more additional information bits may then be transparent to the second receiving node 13. The transmitting node 12, the processing circuitry 1301 and/or the transmitting module 1303 may be configured to transmit configuration to one or more receiving nodes comprising information regarding a channel carrying the bursts of energy. The information comprises radio frequency, a set of timeslots used, a training sequence code and/or modulation used, and/or information regarding how the one or more additional information bits are mapped to the shift in the one or more signal characteristics.

The transmitting node 12 may comprise a mapping module 1304. The transmitting node 12, the processing circuitry 1301 and/or the mapping module 1304 may be configured to map the one or more additional information bits to a code matrix by means of a diversity code, the code matrix comprises a number of rows that is equal to the number of transmit antennas of the transmitting node 12 and a number of columns. The diversity code may be a space-time block code, a differential space-time code and/or similar.

The transmitting node 12 may comprise an applying module 1305. The transmitting node 12, the processing circuitry 1301 and/or the applying module 1305 may be configured to apply respectively for each transmit antenna out of the number of transmit antennas, the determined shift in one or more signal characteristics of the burst of energy, for carrying the one or more additional information bits, according to an entry of a column in the matrix, wherein each entry in the column is a complex number with one or more signal characteristics.

The transmitting node 12 may comprise a realizing module 1306. The transmitting node 12, the processing circuitry 1301 and/or the realizing module 1306 may be configured to realize the determined shift in one or more signal characteristics of the burst of energy by changing a timing, frequency, amplitude and/or phase of the burst of energy.

The transmitting node 12 may comprise an adding module 1307. The transmitting node 12, the processing circuitry 1301 and/or the adding module 1307 may be configured to add the determined shift to the burst of energy that is already coded using a diversity code on symbol level.

The one or more additional information bits may be to convey control signalling, system information, in-band signalling, user plane data, buffer status and/or device capability, of the transmitting node 12.

The transmitting node 12 and/or the first receiving node 10 may be an Internet of Things device.

The methods according to the embodiments described herein for the transmitting node 12 are respectively implemented by means of e.g. a computer program 1308 or a computer program product, comprising instructions, i.e., software code portions, which, when executed on at least one processor, cause the processor circuitry o means to carry out the actions described herein, as performed by the transmitting node 12. The computer program 1308 may be stored on a computer-readable storage medium 1309, e.g. a disc or similar. The computer-readable storage medium 1309, having stored thereon the computer program 1308, may comprise the instructions which, when executed on the processing circuitry 1301, cause the processing circuitry 1301 to carry out the actions described herein, as performed by the transmitting node 12. In some embodiments, the computer-readable storage medium 1309 may be a non-transitory computer-readable storage medium. The transmitting node 12 may comprise a memory 1310 configured to store shifts, matrices, data, additional informational bits, payload, applications to perform the method herein and/or similar. The transmitting node 12 may comprise a table or similar mapping the additional information bits to information, e.g. bits '01' means a certain transmission mode or operational mode.

Furthermore, the first receiving node 10 for receiving at least one burst of energy from the transmitting node 12 in the wireless communication network 1 is herein provided, The at least one burst of energy is configured to carry a payload for one or more receiving nodes, e.g. the second receiving node 13 and/or the first receiving node 10, The first receiving node 10 may comprise processing circuitry 1401 and/or a receiving module 1402. The first receiving node 10, the processing circuitry 1401 and/or the receiving module 1402 may be configured to receive a burst of energy of the at least one burst of energy from the transmitting node 12. The first receiving node 10, the processing circuitry 1401 and/or the receiving module 1402 may be configured to receive a plurality of bursts of energy in sequence.

The first receiving node 10 may comprise a detecting module 1403. The first receiving node 10, the processing circuitry 1401 and/or the detecting module 1403 may be configured to detect a shift in one or more signal characteristics of the received burst of energy compared to a reference signal characteristic known to the first receiving node 10. The reference signal characteristic may be a signal part of the burst of energy and the first receiving node 10, the processing circuitry 1401 and/or the detecting module 1403 may be configured to detect the shift on at least a part of the signal part of the burst of energy. The first receiving node 10, the processing circuitry 1401 and/or the detecting module 1403 may be configured to detect the shift relative to a previous burst of energy.

The first receiving node 10 may comprise a determining module 1404. The first receiving node 10, the processing circuitry 1401 and/or the determining module 1404 may be configured to determine one or more additional information bits, in addition to the payload, intended for the first receiving node 10, of the burst of energy based on the detected shift. The one or more additional information bits may be to convey control signalling, system information, in-band signalling, user plane data, buffer status and/or device capability, of the transmitting node 12. The first receiving node 10 may comprise a table mapping the additional bits to information e.g. a certain bit or bits indicates a certain system information, an operational mode or similar. The first receiving node 10, the processing circuitry 1401 and/or the determining module 1404 may be configured to determine a radio channel, carrying the burst of energy, as a radio channel with stationary channel characteristics or a radio channel with channel characteristics varying in a manner known or predicted at the first receiving node 10.

The first receiving node 10 may comprise a decoding module 1405. The first receiving node 10, the processing circuitry 1401 and/or the decoding module 1405 may be configured to decode the received burst of energy of the at least one burst of energy as a diversity code. The diversity code may be a space-time block code, a differential space-time code and/or similar.

The first receiving node 10 may comprise a realizing module 1406. The first receiving node 10, the processing circuitry 1401 and/or the realizing module 1406 may be configured to realize the detected shift in one or more signal characteristics of the burst of energy by detecting a change in timing, frequency, amplitude and/or phase of the burst of energy.

The first receiving node 10 may comprise a configuring module 1407. The first receiving node 10, the processing circuitry 1401 and/or the configuring module 1407 may be configured to configure the first receiving node 10 for receiving the one or more additional information bits by receiving configuration from the transmitting node 12. The configuration may comprise information regarding a channel carrying the bursts of energy, which information comprises radio frequency, a set of timeslots used, a training sequence code and/or modulation used, and/or information regarding how the additional information bits are mapped to the shift in the one or more signal characteristics.

The transmitting node 12 and/or the first receiving node 10 may be an Internet of Things device.

The methods according to the embodiments described herein for the first receiving node 10 are respectively implemented by means of e.g. a computer program 1408 or a computer program product, comprising instructions, i.e., software code portions, which, when executed on the processing circuitry, cause the processor circuitry or means to carry out the actions described herein, as performed by the first receiving node 10. The computer program 1408 may be stored on a computer-readable storage medium 1409, e.g. a disc or similar. The computer-readable storage medium 1409, having stored thereon the computer program 1408, may comprise the instructions which, when executed on the processing circuitry 1401, cause the processing circuitry 1401 to carry out the actions described herein, as performed by the first receiving node 10. In some embodiments, the computer-readable storage medium 1409 may be a non-transitory computer-readable storage medium. The first receiving node 10 may comprise a memory 1410 configured to store shifts, matrices, data, additional informational bits, payload, mapping of the bits to information, applications to perform the method herein and/or similar.

System Aspects

When a so called super-channel is operated in a wireless communication network, e.g. WiFi or GSM, as described in above, possibly extended with a transmit diversity scheme according to the embodiments herein, it is necessary for the receiver(s) of the super-channel to know where to find the super-channel, its characteristics, and the characteristics of the underlying channel. E.g., for GSM this information may include the radio frequency, the set of timeslots used, the training sequence code(s) and modulation(s) used on the underlying channel, whether a transmit diversity scheme, according to embodiments herein, is used, etc.

This information may be broadcast in the cell from the transmitting node 12. It may also be conveyed to the first receiving node 10 in a dedicated signaling message following an access attempt by the first receiving node 10. E.g. in GSM, the information may be broadcast in a System Information (SI) message on the Broadcast Control Channel (BCCH) or sent in a dedicated message, or dedicated part of a message, on the Access Grant Channel (AGCH).

According to some embodiments, the transmitting node 12 transmits a signal to the first receiving node 10 over a radio channel with characteristics carrying phase and amplitude information to be estimated at the first receiving node 10. The transmitting node determines a change in signal characteristics such as amplitude and/or phase and/or time shift variation relative to reference characteristics be added to the signal. The transmitting node then transmits the signal to the first receiving node 10, wherein the changed signal characteristics carries information for the first receiving node 10. The information or one or more additional information bits may be transmitted to the first receiving node not able to receive the payload but able to determine shift or not, resulting in a more redundant transmission enabling reception in e.g. a cellar or similar. The channel has stationary channel characteristics or is a radio channel with channel characteristics varying in a manner known or predicted at the first receiving node 10. Phase/amplitude shifts may be picked from the columns of space-time code matrices. These phase/amplitude shifts are information bearing, and are applied to the packets/bursts in a multi-antenna wireless system, such as GSM or IEEE 802.11. At the first receiving node 10, known training sequences, together with channel estimates, are used to derive a channel for the space-time code matrices, from which both coherent and non-coherent optimum receivers are also derived. The information bearing space-time code matrices form a very robust, low rate signaling channel, on top of the normal space-time transmissions used in the multi-antenna wireless system. This type of signaling does not degrade the performance of legacy devices utilizing the underlying wireless system.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a transmitting/receiving node, for example.

Alternatively, several of the functional elements of the processing circuitry/means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance trade-offs inherent in these design choices.

It will be appreciated that the foregoing description and the accompanying drawings represent non-limiting examples of the methods and apparatus taught herein. As such, the inventive apparatus and techniques taught herein are not limited by the foregoing description and accompanying drawings. Instead, the embodiments herein are limited only by the following claims and their legal equivalents.

The invention claimed is:

1. A method performed in a transmitting node for transmitting at least one burst of energy to one or more receiving nodes in a wireless communication network, wherein the transmitting node comprises a number of transmit antennas being more than one and wherein the at least one burst of energy carries a payload for one or more receiving nodes, the method comprising:

determining a shift, for one or more transmit antennas, in one or more signal characteristics of a burst of energy of the at least one burst of energy, which shift indicates one or more additional information bits, in addition to the payload, for a first receiving node;

transmitting, over the one or more transmit antennas, the burst of energy of the at least one burst of energy with the shift in the one or more signal characteristics, and carrying the payload to one or more receiving nodes in the wireless communication network; and wherein the method further comprises:

mapping the one or more additional information bits to a code matrix by means of a diversity code, the code matrix comprises a number of rows that is equal to the number of transmit antennas of the transmitting node and a number of columns; and applying, respectively for each transmit antenna out of the number of transmit antennas, the determined shift in one or more signal characteristics of the burst of energy, for carrying the one or more additional information bits, according to an entry of a column in the matrix, wherein each entry in the column is a complex number with one or more signal characteristics.

2. The method according to claim 1, wherein the diversity code is a space-time block code or a differential space-time code.

3. A transmitting node for transmitting at least one burst of energy to one or more receiving nodes in a wireless communication network, wherein the transmitting node comprises a number of transmit antennas being more than one and wherein the at least one burst of energy is configured to carry a payload for one or more receiving nodes, the transmitting node being configured to:

determine a shift, for one or more transmit antennas, in one or more signal characteristics of a burst of energy of the at least one burst of energy, which shift indicates one or more additional information bits, in addition to the payload, for a first receiving node; and transmit over the one or more transmit antennas, the burst of energy of the at least one burst of energy with the shift in the one or more signal characteristics, and carrying the payload to one or more receiving nodes in the wireless communication network;

the transmitting node further being configured to:

map the one or more additional information bits to a code matrix by means of a diversity code, the code matrix comprises a number of rows that is equal to the number of transmit antennas of the transmitting node and a number of columns, and to apply respectively for each transmit antenna out of the number of transmit antennas, the determined shift in one or more signal characteristics of the burst of energy, for carrying the one or more additional information bits, according to an entry of a column in the matrix, wherein each entry in the column is a complex number with one or more signal characteristics.

4. The transmitting node according to claim 3, wherein the diversity code is a space-time block code or a differential space-time code.

* * * * *